(12) United States Patent
Morita et al.

(10) Patent No.: US 6,333,813 B1
(45) Date of Patent: Dec. 25, 2001

(54) STEREOMICROSCOPE

(75) Inventors: Kazuo Morita, Hachioji; Masaaki Ueda; Takashi Fukaya, both of Sagamihara, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/732,751

(22) Filed: Dec. 11, 2000

(30) Foreign Application Priority Data

Jun. 6, 2000 (DE) .............................................. 100 27 851
Jun. 22, 2000 (JP) .................................................. 12-192690

(51) Int. Cl.$^7$ .................................................... G02B 21/00
(52) U.S. Cl. .......................... 359/368; 359/376; 359/384; 359/630
(58) Field of Search .................................... 359/363, 368, 359/369, 372, 375, 376, 384, 630; 600/166

(56) References Cited

U.S. PATENT DOCUMENTS

| | | | |
|---|---|---|---|
| 5,095,887 | * | 3/1992 | Leon et al. ............................. 600/166 |
| 5,557,453 | * | 9/1996 | Schalz et al. ......................... 359/376 |
| 5,601,549 | * | 2/1997 | Miyagi ...................................... 606/4 |
| 6,088,154 | | 7/2000 | Morita . |

FOREIGN PATENT DOCUMENTS 62-166310    7/1987    (JP) .

* cited by examiner

*Primary Examiner*—Mark A. Robinson
(74) *Attorney, Agent, or Firm*—Arnold International; Bruce Y. Arnold

(57) ABSTRACT

The present invention relates to a stereomicroscope comprising an object observation unit and an electronic image unit. The object observation unit includes an objective lens barrel section and a binocular lens barrel section, with the binocular lens barrel section including an interpupillary adjusting mechanism in a light path following a first image plane. The electronic image unit includes an electronic image display device and a projection optical system The object observation unit has an object observation image that remains fixed in position at the first image plane during interpupillary adjustment of the binocular lens barrel section. The projected image from the electronic image display device is made to be substantially in focus at the first image plane. Images at the first image plane may be relayed to a second image plane. An object observation image formed by the object observation unit and an electronic image formed by the electronic image unit may be observed simultaneously in the same field of view by an observer looking into an eyepiece of a binocular lens barrel section. In one embodiment of the invention, the position within the first image plane of the projected image from the electronic image display device is adjustable within a range such that the projected image may lie within or outside of the field of view of a viewer looking into an eyepiece of a binocular lens barrel section.

21 Claims, 5 Drawing Sheets

STEREOMICROSCOPE

BACKGROUND OF THE INVENTION

A stereomicroscope, such as a surgical microscope, has provided an operator with magnified observation images of an affected part in a surgical operation relative to neurosurgery, otolaryngology, ophthalmology, etc., and has played an important role in the improvement of surgical efficiency. In recent years, not only the magnified observation images of the affected part obtained by the stereomicroscope, but also a tomographic image including the surroundings of the affected part, produced by computer aided tomography (CAT) imaging, magnetic resonance (MR) imaging, or ultrasonic imaging, and endoscope observation imaging have come into use in order to plan a surgical operation as well as to perform the surgical operation. Each of these individual imaging types provide useful information when viewed alone. However, greater benefits are achieved when two or more types of images are simultaneously presented to the viewer so that comparisons between the images may be made. In this way, additional information can be provided to the operator as compared to that which is available from viewing the separate images alone.

Thus, it is desired that a stereomicroscope allow an operator to observe, for example, a CAT or MR image and an endoscope observation image simultaneously with the stereomicroscope observation images while looking into the stereomicroscope eyepieces. Stereomicroscopes having this capability are disclosed in Japanese Laid Open Patent Applications S62-166310 and H10-333047.

The stereomicroscope as set forth in Japanese Laid Open Patent Application S62-166310 has an electronic image display means for displaying images (i.e., electronic images) and image projection optical systems for conducting these images to eyepiece optical systems. The eyepiece optical systems are shared so that the electronic images are viewed within the field of view of the stereomicroscope observation image. This publication, however, does not in any way suggest a problem relative to the movement of the eyepiece optical systems caused by the interpupillary adjustment of a stereomicroscope. Nor does this publication suggest a solution to this problem that is solved by the present invention. "Interpupillary adjustment" refers to adjusting the spacing between the left and right eyepieces of the stereomicroscope in order to conform the spacing to the distance between the left and right pupils of an observer. An interpupillary adjustment mechanism is commonly used with stereomicroscopes to account for the variability in interpupillary distance among different observers.

Using the technique described in Japanese Laid Open Patent Application S62-166310 to perform interpupillary adjustment, the electronic image display means and the image projection optical systems must be moved integrally with the eyepiece optical systems. This is required because the images on the electronic image display means are projected in accordance with the movement of the eyepiece optical systems due to interpupillary adjustment. Thus, a sufficient space for moving the electronic image display means and projection optical systems in the housing of the stereomicroscope is required, causing the housing to be larger than otherwise needed. In a stereomicroscope such as a surgical microscope, compactness of the entire microscope is indispensable for improved work efficiency. However, with the technique described in Japanese Laid Open Patent Application S62-166310, achieving compactness is impossible.

On the other hand, in the stereomicroscope disclosed in Japanese Laid Open Patent Application H10-333047, each image projection optical system is divided into a collimating optical system and an imaging optical system. An arrangement is made so that only the imaging optical system is moved integrally with an eyepiece optical system in accordance with the interpupillary adjustment in order to always receive an image beam that emerges from a collimating optical system. An electronic image display means remains fixed with respect to the interpupillary adjustment, but the displayed electronic image is projected in accordance with the movement of the eyepiece optical system so that the stereomicroscope observation image and the projected electronic image can be observed simultaneously. Thus, a portion of the image projection optical system is moved during interpupillary adjustment, and a space is required for this movement. Therefore, a larger size housing is again required as compared to the housing size that would be needed if there were no movement of a portion of the image projection system during interpupillary adjustment, and optimum compactness is again not achieved.

BRIEF SUMMARY OF THE INVENTION

This invention relates to a stereomicroscope, such as a surgical microscope, suitable for observing simultaneously microscope observation images and an image displayed on one or more electronic image display devices.

It is, therefore, an object of the present invention to provide a stereomicroscope in which a stereomicroscope observation image can be observed simultaneously with projected electronic images, but with the electronic image display device(s) and the entire image projection optical system(s) remaining fixed during interpupillary adjustment movement of the eyepiece optical system. Thus, a more compact and efficient design is provided.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
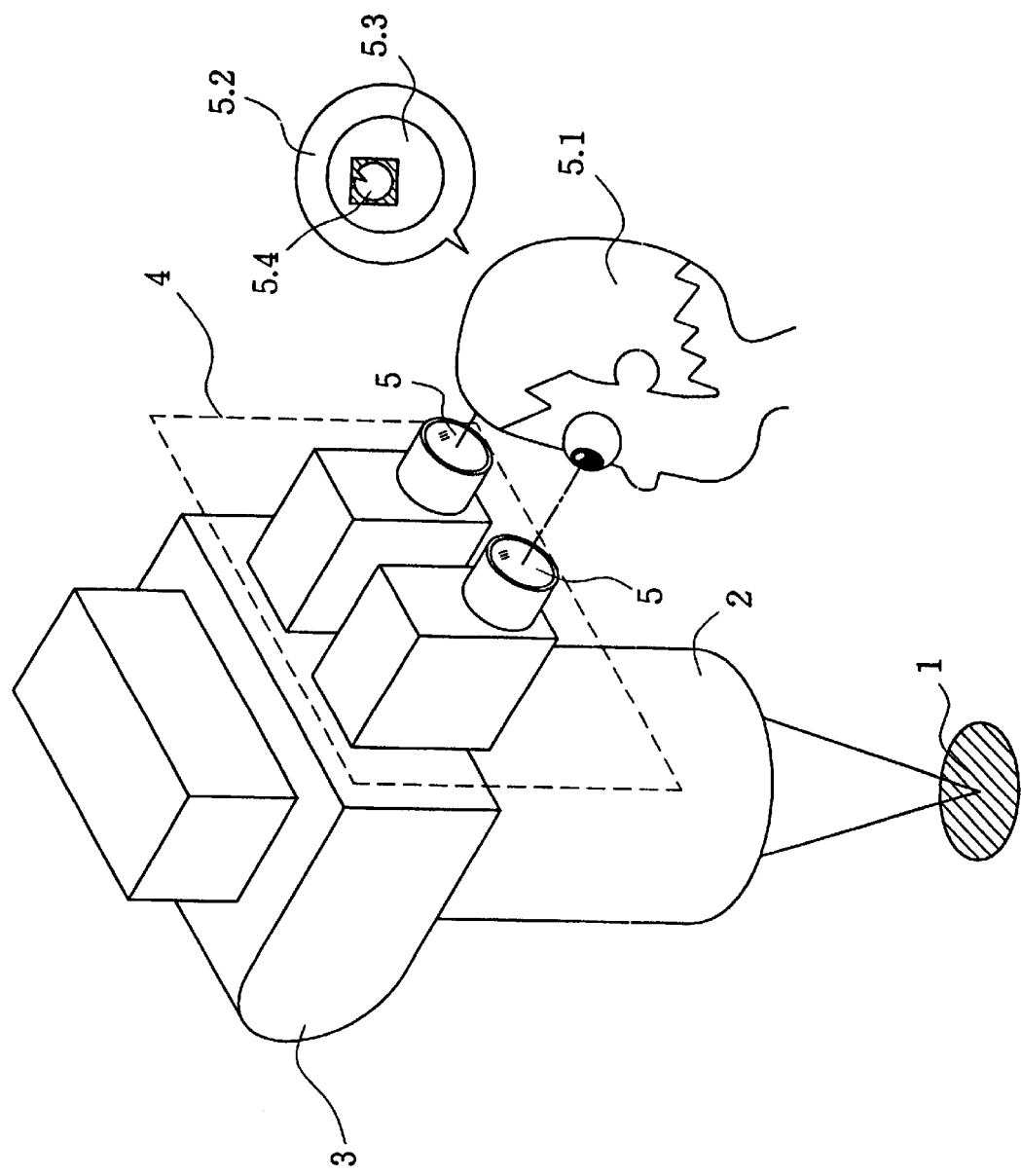
FIG. 1 shows the appearance of a stereomicroscope in a first embodiment of the present invention.

The stereomicroscope of the present invention includes: (1) an object observation unit that has an objective lens barrel section that forms an image at a first image plane, and a binocular lens barrel section that relays images formed at the first image plane to the observer for viewing; and (2) an electronic image display unit that includes an electronic image display device as well as an image projection optical system that relays the electronic display images so as to be substantially in focus at the first image plane. The binocular lens barrel section includes an interpupillary adjusting mechanism; however, this adjustment mechanism is in the light path following the first image plane. Such a construction enables images from both the stereomicroscope objective(s) and images from the electronic image display device to be observed simultaneously in the samne field of view, and yet remain stationary during interpupillary adjustment of the stereomicroscope.

By having the interpupillary adjusting mechanism in the light path following the first image plane, the stereomicroscope observation images are not shifted when the eyepiece optical system is moved for interpupillary adjustment. Further, there is no need to move the electronic image display device or the image projection optical system during interpupillary adjustment, and it is no longer necessary to provide space for such movement in the housing of the stereomicroscope. Consequently, it becomes possible for a viewer to simultaneously observe the stereomicroscope observation images and the image(s) displayed on the electronic image display device(s) using a more compact stereomicroscope. In addition, the construction of the stereomicroscope is simplified as compared with prior construction arrangements.

The first image plane is physically located within an afocal optical relay system. A stereomicroscope observation image that is formed at the first image plane may be relayed by the rear lens unit of the afocal relay optical system and an imaging optical system to a second image plane. Images at this image plane or the first image plane may then be magnified by observing them through an eyepiece optical system. The imaging optical system and the eyepiece optical system are the optical systems of an ordinary binocular lens barrel section. Without modifying these optical systems, a medical image such as an endoscope image that is displayed on an electronic image display device and projected so as to be in-focus at the first image plane can be observed simultaneously with the microscope observation image within the visual field of the microscope.

Where a plurality of binocular tens barrels are attached to a stereomicroscope, viewers corresponding in number to the attached binocular lens barrels can simultaneously observe the stereomicroscope observation images and the electronic display images. In particular, when optical systems which form the first image plane and which help relay it are constructed using a single lens system, it is only necessary to provide one electronic image display and one image projection optical system. As a result, each of a plurality of viewers can observe the displayed images in the visual field of the microscope, and thus a lightweight and compact design of the stereomicroscope can be achieved. Various embodiments of the invention will now be described in detail with reference to the drawings.

Embodiment 1

Figure 2:
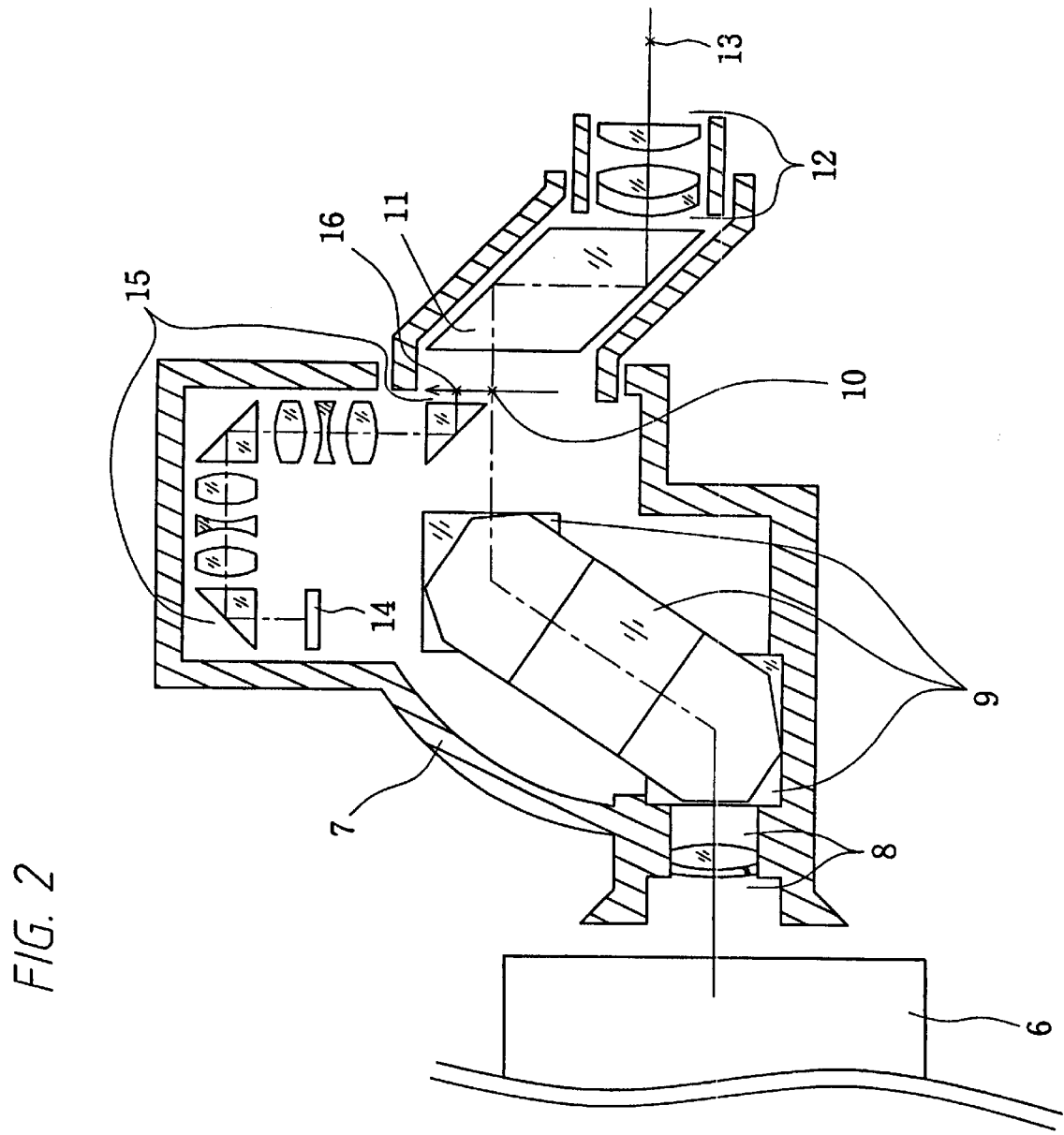
FIG. 2 is a schematic, sectional view showing the construction of a binocular lens barrel section of the stereomicroscope shown in FIG. 1.

FIGS. 1 and 2 show a first embodiment of the present invention. Referring to FIG. 1, an object 1 to be observed is viewed via a body section 2 of a stereomicroscope by a viewer 5.1 looking through left and right eyepiece optical systems 5,5 which are attached to a binocular lens barrel section 3 of a stereomicroscope using a "Siedentoph" interpupillary adjusting mechanism 4. An observation image 5.2, which includes a stereomicroscope observation image 5.3 as well as an electronic display image 5.4, is observed by the viewer. In the Siedentoph interpupillary adjusting mechanism 4, two-reflection optical systems, such as parallelogram prisms, in which the reflecting surfaces are parallel and the incident optical axis and the emergent optical axis are offset with respect to each other, are placed in the light paths immediately following the left and right optical systems that are provided inside the binocular lens barrel section 3. The two-reflection optical systems are rotated about their respective incident optical axes in directions opposite to each other, thereby changing a distance between the left and right eyepiece optical systems placed on the emergent optical axes of the left and right, twvo-reflection optical systems.

FIG. 2 is a schematic, sectional view showing the construction of a binocular lens barrel section of the stereomicroscope shown in FIG. 1. Light from the body section 6 of the stereomicroscope enters the housing 7 via an imaging lens 8 positioned within the binocular lens barrel section. The light is then reflected twice by surfaces of a prism 9 and forms an image at first image plane 10 before entering a parallelogram prism 11 which constitutes the Siedentoph interpupillary adjusting mechanism. The light then passes through an eyepiece optical system 12 to an exit pupil position 13. Also, images formed on a small-sized LCD 14 are relayed via image projection optical system 15 so as to be substantially in focus at first image plane 10 and so as to be centered within first image plane 10 at position 16.

The first image plane 10 is located at a position where images are not shifted by the interpupillary adjustment mechanism, namely, before the light enters the parallelogram prism 11. According to this arrangement, images from the microscope and from the electronic image display are not moved at first image plane 10 even when the eyepiece optical system is moved for interpupillary adjustment. Hence, there is no need to move either of the electronic image display or the image projection optical system when performing interpupillary adjustment of the eyepiece optical axes, and it becomes unnecessary to provide a space for movement in the housing of the binocular lens barrel section of the stereomicroscope. Consequently, it becomes possible for a viewer to observe simultaneously the stereomicroscope observation image and the image displayed on the electronic image display using a more compact stereomicroscope that provides increased work efficiency.

Embodiment 2

Figure 3:
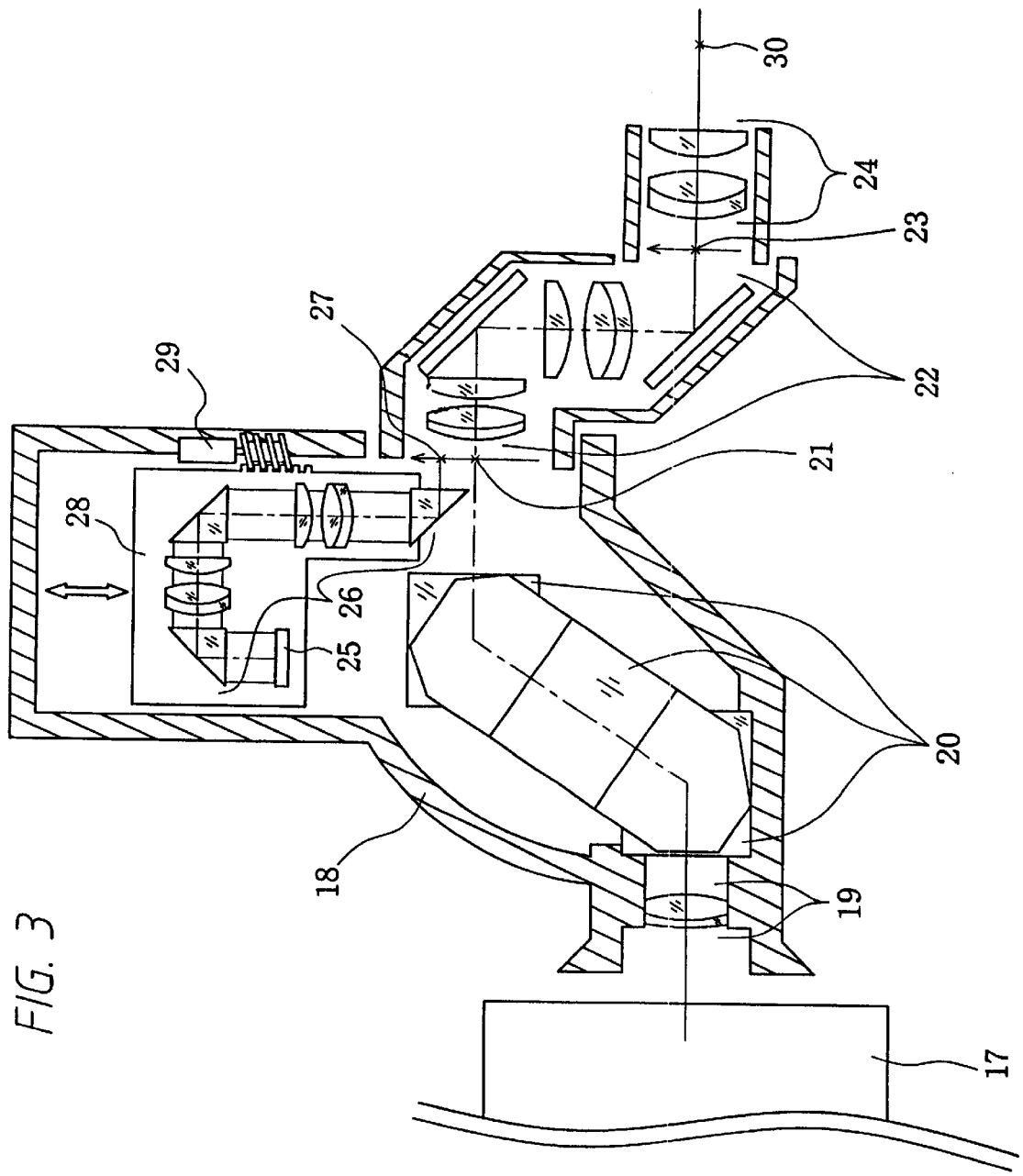
FIG. 3 is a schematic, sectional view showing the arrangement of the optical system of a binocular lens barrel section of the stereomicroscope according to a second embodiment of the present invention.

FIG. 3 shows a second embodiment of the present invention. Light from the body section 17 of the stereomicroscope enters the housing 18 of the binocular lens barrel section via an imaging lens 19 positioned within the binocular lens barrel section. The light is then reflected twice by surfaces of a prism 20 and forms an image at a first image plane 21 before entering a relay optical system 22 which fonns a second image at a second image plane 23. The light then passes through an eyepiece optical system 24 and exit pupil position 30. Also, images formed on a small-sized LCD 25 are relayed via an image projection optical system 26 to position 27, which corresponds to the first image plane 21. This embodiment differs from the first embodiment in that the position of an electronic display image, as seen in the field of view of the microscope, can be varied. This is accomplished by varying the position of a holding member 28 for supporting the small-sized LCD and the image projection optical system 26 by using a motor 29 and drive mechanism (not labeled), as illustrated.

The first image plane 21 formed by the imaging lens 19 of the binocular lens barrel optical system is located at a position that is not moved by the interpupillary adjustment mechanism. The first image plane 21 is relayed by the relay optical system 22 so that the second image plane 23 is located immediately before the eyepiece optical system 24. When interpupillary adjustment occurs, the second image plane 23 is moved, together with the eyepiece optical system, so that a magnified image of the second image plane 23 may be observed by a viewer. The image projection optical system 26 relays an image electronically created on the small-sized LCD 25 such that the relayed image is formed at the first image plane 21. In addition, the holding member 28 for supporting the small-sized LCD and the image projection optical system is moved by using a motor 29, and thereby the position within first image plane 21 where the electronic display image is formed can be shifted in a range within or outside the eyepiece field of view. According to this construction, it is only necessary that the electronic image projection optical system be moved in order to shift the position where the image is projected to the fixed, first image plane 21. Consequently, a simple and compact stereomicroscope apparatus can be obtained where the viewer can simultaneously see the stereomicroscope observation images and an electronic display image, if desired, with the position of the electronic display image in the field of view of the microscope being adjustable. In this manner, a compact stereomicroscope is provided wherein the position of the electronic display image within the first image plane may be readily adjusted.

Embodiment 3

Figure 4:
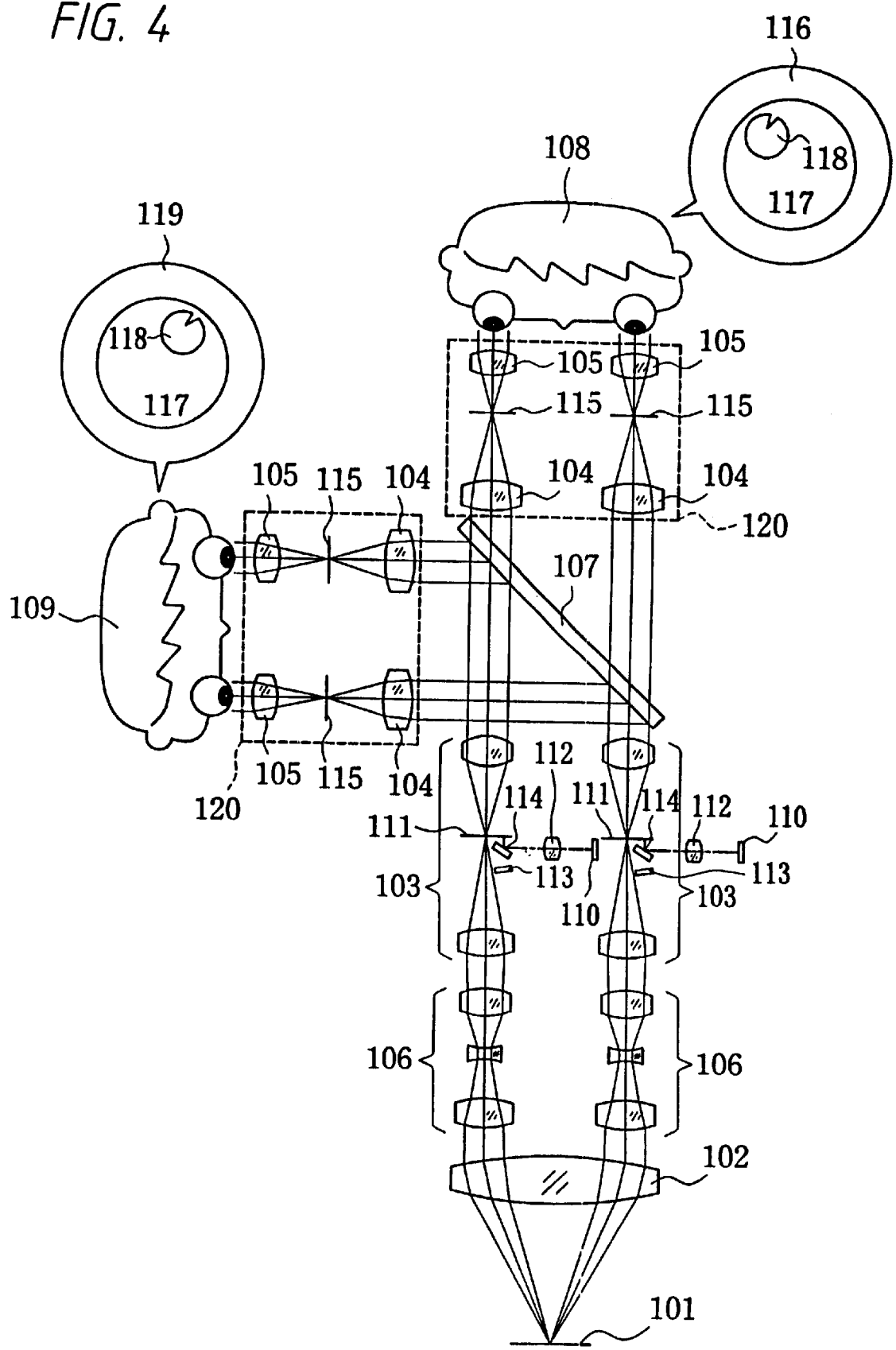
FIG. 4 shows the arrangement of the optical system of a stereomicroscope according to a third embodiment of the present invention.

FIG. 4 shows a third embodiment of the present invention The stereomicroscope of this embodiment includes an objective optical system 102 for receiving light beams from an object 101, and afocal relay optical systems 103,103 for receiving each light beam, forming an image at a first image plane 111 that is positioned within the afocal relay optical system, and relaying each beam as a collimated beam. Variable magnification optical systems 106,106 are provided between the objective optical system 102 and the afocal relay optical systems 103,103. The arrangement of components is such that the collimated light beams emerging from the afocal relay optical systems 103,103 are directed toward a chief viewer 108 and a sub-viewer 109 by a beam splitter 107. Thus, the stereomicroscope of this embodiment also includes pairs of imaging optical systems 104,104 for re-imaging the collimated light beams from the afocal relay optical systems, and pairs of eyepiece optical systems 105, 105 for magnifying relayed images formed at second image planes 115,115. The stereomicroscope of this embodiment further includes: electronic image displays 110,110 for providing in-field images selected from various observation images such as CAT, MR, ultrasonic, and endoscope images; projection optical systems 112,112 for projecting images displayed on the electronic image displays onto the first image planes 111, 111; light-blocking members 113,113 for partially intercepting the light beams from the object 101, and reflecting members 114,114 for reflecting light beams emerging from the projection optical systems to convey the light beams to portions where the light beams are intercepted by the light-blocking members 113,113. Consequently, in each of the first image planes 111,111 a part of the microscope observation image is blocked so that, in the blocked part, light beams emanating from electronic image displays 110,110 may be simultaneously displayed so as to be seen by the viewer.

FIG. 4 also illustrates an observation image 116 as seen by each eye of the chief viewer 108, which image includes a microscope observation image 117 and an electronic display image 118, as well as an observation image 119 as seen by each eye of an assistant viewer 109. The chief viewer and the assistant viewer each view the operation by looking through respective binocular lens barrel sections 120,120. Since the stereomicroscope of the third embodiment is constructed as mentioned above, the images at the first image planes 111,111 are relayed and focused onto the second image planes 115, 115. The pairs of eyepiece optical systems 105,105 magnify these images for viewing. Thus, without entirely changing the construction of the binocular lens barrel sections 120 for the chief viewer and the sub-viewer, each of the viewers can simultaneously observe, for example, an endoscope observation image displayed on the electronic image display 110 and the stereomicroscope observation images. Also, the image plane where each of the image projection optical systems projects the image displayed on the electronic image display is the first image plane 111. This image plane is formed within the relay optical systems 103,103 and is fixed with respect to interpupillary adjustment of the binocular lens barrel section. Therefore, there is no need to move the electronic image display device or the image projection optical system in accordance with an interpupillary adjustment of the binocular lens barrel section. Further, it becomes unnecessary to provide a space for movement of optical components in the housing of the stereomicroscope. Consequently, a more compact stereomicroscope having improved efficiency in terms of use and manufacture can be provided.

Figure 5:
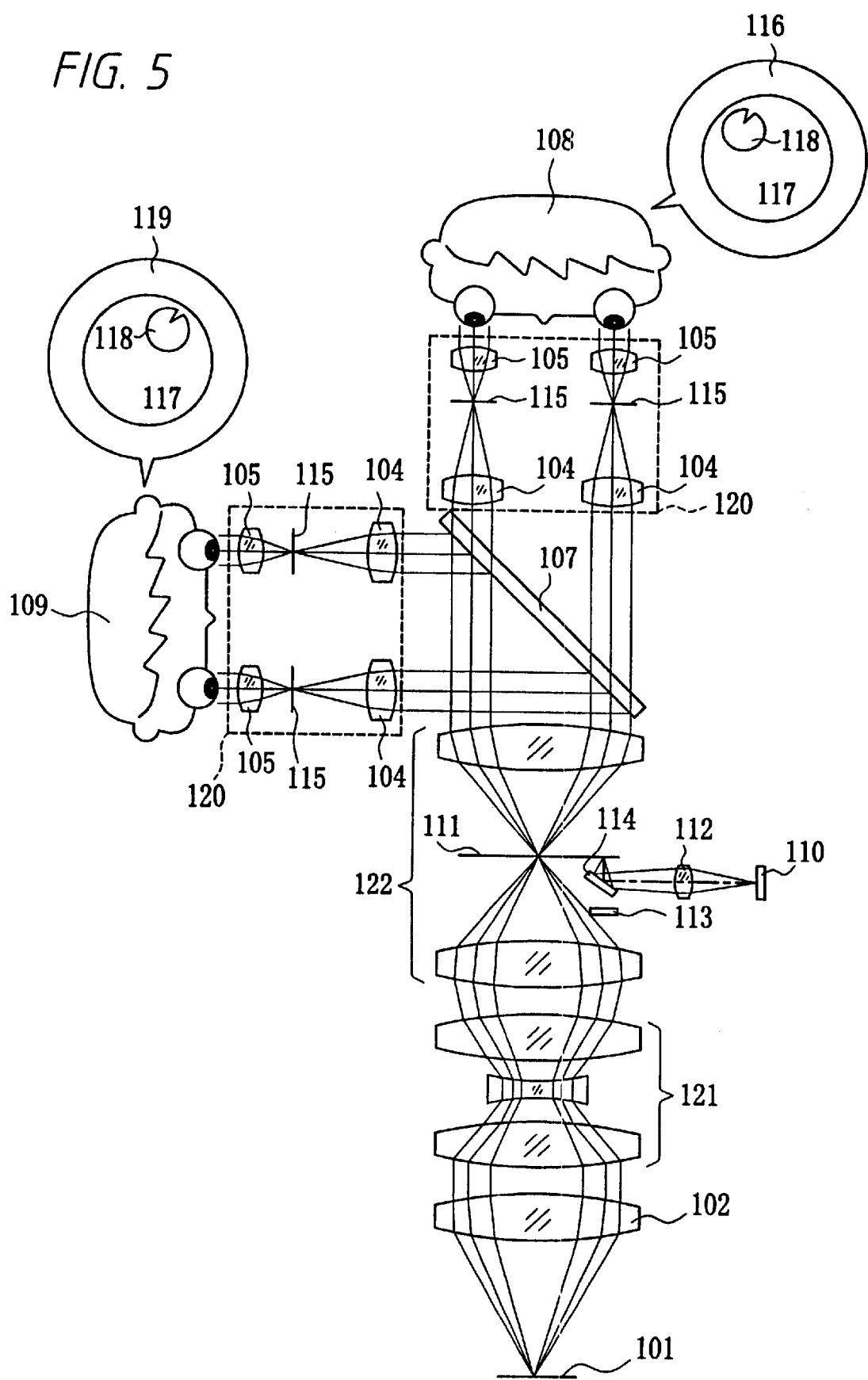
FIG. 5 shows a modified arrangement of the optical system of FIG. 4.

In FIG. 5, a single variable magnification optical system 121 and single, afocal relay optical system 122, respectively, replace the two variable magnification optical systems 106 and the two relay optical systems 103 shown in FIG. 4. According to this construction, it is only necessary to provide a single electronic image display device 110, a single image projection optical system 112, a single light-blocking member 113, and a single reflecting member 114. It is thus possible to achieve a simpler design stereomicroscope that is more compact. The function and effect of the stereomicroscope of FIG. 5 is otherwise similar to the embodiment shown in FIG. 4.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A stereomicroscope having a compact structure which provides an electronic image and one or more images formed by an objective of said stereomicroscope so as to be substantially in focus at a first image plane, said stereomicroscope comprising:

an object observation unit that includes an objective lens barrel section and a binocular lens barrel section, the binocular lens barrel section including an interpupillary adjusting mechanism in a light path following said first image plane; and an electronic image unit that includes an electronic image display device and a projection optical system;

wherein the object observation unit forms at least one object observation image at said first image plane and the electronic image unit forms an image substantially at the first image plane, the position of said at least one object observation image at said first image plane remaining stationary during adjustment of the interpupillary distance by the interpupillary adjustment mechanism to thereby provide an electronic display image that may be viewed while viewing one or more images formed by the object observation unit without need to move the projection optical system during movement of the interpupillary adjustment mechanism.

2. The stereomicroscope of claim 1, said binocular lens barrel section comprising:

a movable lens barrel that may be moved by said interpupillary adjusting mechanism; and a fixed lens barrel.

3. The stereomicroscope of claim 2, and further comprising a beam splitter and an additional lens barrel section so as to allow a plurality of observers to use the stereomicroscope simultaneously.

4. The stereomicroscope of claim 2, wherein a projected image of an electronic image display device is provided for at least one eye of an observer.

5. The stereomicroscope of claim 2, wherein a projected image of an electronic image display device is provided for both eyes of an observer.

6. The stereomicroscope of claim 1, said objective lens barrel section comprising an objective optical system and a relay optical system, said first image plane lying within the relay optical system.

7. The stereomicroscope of claim 6, said object observation unit further including a beam splitter and an additional binocular lens barrel section, said beam splitter positioned between the objective lens barrel section and the binocular lens barrel sections.

8. The stereomicroscope of claim 7, said objective lens barrel section further comprising a pair of variable magnification optical systems, each variable magnification optical system being paired with a different eyepiece of a given binocular lens barrel section.

9. The stereomicroscope of claim 8, wherein an image formed by said electronic image display device is projected to at least one eyepiece of a binocular lens barrel section.

10. The stereomicroscope of claim 8, wherein the image formed by said electronic image display device and projected to said first image plane is relayed to second image planes and then viewed by both eyepieces of a binocular lens barrel section.

11. The stereomicroscope of claim 7, said objective lens barrel section further including a single variable magnification optical system.

12. The stereomicroscope of claim 11, wherein said first image plane is provided to both eyes of at least one observer.

13. The stereomicroscope of claim 11, wherein a moveable range of the projected image from said electronic image display device is within the field of view of an observer looking into an eyepiece of the binocular lens barrel section.

14. The stereomicroscope of claim 11, wherein a moveable range of the projected image from said electronic image display device includes positions that are within as well as outside the field of view of an observer looking into an eyepiece of the binocular lens barrel section.

15. The stereomicroscope of claim 11, said moving mechanism including a motor.

16. The stereomicroscope of claim 1, and further comprising a moving mechanism which moves the position, within the first image plane, of the projected image from said electronic image display device.

17. The stereomicroscope of claim 1, said electronic image display device being a small-size LCD.

18. The stereomicroscope of claim 1, wherein a member is provided to interrupt the luminous flux of the object observation image in a region which corresponds to the projected image from the electronic image display device.

19. The stereomicroscope of claim 1, said electronic image display device displaying a computer assisted tomography image.

20. The stereomicroscope of claim 1, said electronic image display device displaying a magnetic resonance image.

21. The stereomicroscope of claim 1, said electronic image display device displaying an endoscope image.

* * * * *

UNITED STATES PATENT AND TRADEMARK OFFICE
CERTIFICATE OF CORRECTION

PATENT NO. : 6,333,813 B1
DATED : December 25, 2001
INVENTOR(S) : Morita et al.

It is certified that error appears in the above-identified patent and that said Letters Patent is hereby corrected as shown below:

Title page,
Item [30], Foreign Application Priority Data,
Change "100 27 851" to -- 100 27 851.5 --;

Column 3,
Line 8, change "samne" to -- same --;

Column 4,
Line 11, change "twvo-reflection" to -- two-reflection --; and
Line 52, change "fonns" to -- forms --.

Signed and Sealed this

Sixteenth Day of July, 2002

Attest:

Attesting Officer

JAMES E. ROGAN
Director of the United States Patent and Trademark Office